United States Patent Office 3,830,787
Patented Aug. 20, 1974

3,830,787
CATALYSTS FOR THE POLYMERIZATION
OF OLEFINS
Ermanno Susa, Ferrara, Velmore Davoli, Reggio Emilia, and Adolfo Mayr, Ferrara, Italy, assignors to Montecatini Edison S.p.A., Milan, Italy
No Drawing. Filed Apr. 5, 1972, Ser. No. 241,450
Claims priority, application Italy, Apr. 6, 1971, 22,790/71
Int. Cl. B01j 11/84; C08f 1/56
U.S. Cl. 260—94.9 D                    12 Claims

ABSTRACT OF THE DISCLOSURE

New catalysts for the polymerization of olefins, more particularly for the polymerization of ethylene and mixtures thereof with higher alpha-olefins are disclosed, as well as methods for preparing the same, and for polymerizing olefins therewith. The new catalysts are prepared by mixing a hydride or organometallic compound of a metal belonging to Group I, II or III of the Mendelyeev Periodic Table with the product obtained by contacting a titanium compound with the solid reaction product of a hydrated magnesium halide and an organometallic compound of one of said Groups I to III metals, in a molar ratio organometallic compound/$H_2O$ of at least 1.

THE PRIOR ART

Ethylene has been polymerized by means of catalysts of various types. One of the best known of such catalysts is the product obtained by mixing a titanium compound with an organometallic compound of a Group I to III metal.

Our group has disclosed other catalysts which are highly active in the polymerization of olefins and consisting of the product obtained by mixing a hydride or organometallic compound of Group I to III metal with the product obtained by contacting a titanium compound with an anhydrous magnesium halide under conditions such that the magnesium halide is converted to an active state, or with anhydrous magnesium halide in preactivated condition.

THE PRESENT INVENTION

It has been found that catalysts having a high activity can be obtained by using, as one catalyst-forming component (component (a)), the product obtained by contacting a titanium compound with a solid carrier obtained by reacting a hydrated magnesium halide with an organometallic compound of a metal belonging to Groups I to III of the Mendelyeev Periodic Table.

Component (b) of the final catalyst is the same or a different organometallic compound of a Group I to III metal.

The liquid phase of the reaction between the hydrated magnesium halide and the organometallic compound, containing an excess of the starting organometallic compound and/or other organometallic compounds formed in the reaction may be used as catalyst-forming component (b).

This constitutes an additional advantage of this invention, inasmuch as the organometallic compound may be used before for activating the carrier and subsequently as the co-catalyst, component (b).

For this purpose, the liquid phase of the reaction between the hydrated magnesium halide and the organometallic compound may be separated, or not, from the solid reaction product. In fact, the Ti compound may be contacted with the activated solid carrier in the presence of the liquid reaction phase and the whole mass may be introduced into the polymerization zone as the final catalytic system, the excess organometallic compound serving as catalyst-forming component (b).

The hydrated magnesium halide useful for the preparation of the catalyst according to this invention is represented by the formula: $MgX_2 \cdot nH_2O$, in which X is halogen and $n$ is a number greater than zero.

Preferred Mg halides are the hydrated Mg chlorides and bromides containing up to 6 moles of $H_2O$. Particularly good results are obtained with $MgCl_2 \cdot H_2O$;

$$MgCl_2 \cdot 2H_2O;$$

and $MgCl_2 \cdot 6H_2O$.

Any organometallic compound of the Groups I to III metals can be used in preparing component (a) and as the co-catalyst of the final catalytic system. Good results are obtained using triisobutyl aluminum.

The hydrated magnesium halide and organometallic compound can be reacted at temperatures between 50° C. and 150° C. Preferably the reaction is carried out at a temperature of from 80° C. to 100° C.

Such reaction can be carried out in an inert diluent such as n-heptane, the suspension thus obtained being maintained at the boiling point until the development of gas is observed. The concentration of the suspension is not critical.

The resulting solid reaction product may be separated from the liquid phase by filtering, washed with an inert diluent, preferably the diluent in which the reaction was carried out, dried, and finally contact with the Ti compound.

We have found that the solid product of the reaction between hydrated magnesium halide and the organometallic compound consists prevailingly of anhydrous magnesium halide in a form which renders it particularly suitable for use as a carrier for various Ti compounds to provide a catalyst-forming component which yields a final catalyst which is particularly active in the polymerization of olefins and notably of ethylene and mixtures thereof with higher alpha-olefins.

The solid product of the reaction between the hydrated magnesium halide and organometallic compound (with or without separation thereof from the liquid reaction phase) is an active carrier for a wide variety of Ti compounds.

Titanium compounds which are particularly useful for the preparation of the catalysts of this invention are the halides such as $TiCl_4$ and $TiCl_3$; oxyhalides; alcoholates; haloalcoholates and in particular the chloro-alcoholates; halotitanates or ammonium, alkyl ammonium, and alkaline metal titanates; titanium-amides; titanium haloamides; titanium salts of organic acids; and the addition compounds of bi-, tri-, and tetravalent titanium with electron-donor compounds in which the electron-donor atoms are, in general, N, P. O and S atoms, such as ethers, phosphines, amines and thioethers.

Other useful titanium compounds are those obtainable from the above-mentioned Ti compounds and from alcoholates and amides of the alkaline metals, such as, for instance: $Ti(OC_3H_7)_2Cl_3$ and $LiTi(C_{12}H_8N)_4$, where $C_{12}H_8N$ represents the carbazyl radical. Still other useful Ti compounds are those of the type $(Ti(BH_4)_nX_m$, in which X is halogen, $n$ is a whole number comprised between 1 and the valence of Ti, $m$ is a whole number comprised between 0 and the valence of the Ti minus 1; the oxygen-containing Ti compounds in which at least one of the Ti valence is engaged, through an —O— bridge, by a radical of an oxygen-containing acid, such as, for example, titanyl sulphates; and Ti compounds in which at least one of the Ti valences is engaged in a Ti—C or Ti—S bond.

The titanium compound can be contacted with the solid product of the reaction between the hydrated magnesium halide and organometallic compound in different ways. Thus, titanium trichloride resulting from the reduction of a starting $TiCl_4$ by ususal techniques can be precipitated on the solid active magnesium-containing carrier. Also, a solid Ti compound can be dispersed in the carrier by a dry-grinding in a ball mill.

The relative quantities of the Ti compound and the solid carrier are not critical. The quantity of Ti present on the solid carrier may vary between 0.1% and 10% by weight. Carriers containing Ti in an amount between 1% and 5% by weight are used advantageously.

Any hydride or organometallic compound of a Group I to III metal known as "activator" of so-called "Ziegler-Natta" catalysts may be used as component (b) of the present catalysts.

As already indicated, component (b) may be the liquid phase of the reaction between the hydrated magnesium halide and organometallic compound.

Preferably, both the organometallic compound reacted with the hydrated magnesium halide to obtain component (a), and which is used as component (b) of the final catalyst is an organo aluminum compound. The molar ratio between component (a) and component (b) is not critical. For the polymerization of ethylene the Al/Ti molar ratio is preferably comprised between 100 and 1000.

The present catalysts are used in the polymerization and copolymerization of olefins according to known processes, that is, in the liquid phase in the presence or absence of an inert solvent, or in the gaseous phase.

The solid Ti-containing product (compoundent (a)) may be mixed with component (b), such as an organo aluminum compound and the mixture introduced into the polymerization reactor, or the two components of the catalytic system may be introduced into the reactor separately.

The polymerization or copolymerization temperature is comprised between —80° C. and 200° C. Preferably, a temperature of from 50° C. to 100° C. is used. The polymerization can be effected at normal atmospheric pressure or at increased pressure.

The molecular weight of the polymer formed can be regulated during the polymerization reaction by including known molecular weight regulating agents (chain transfer agents) such as alkyl halides, organometallic compounds of zinc or cadmium, or hydrogen. These catalysts not only exhibit a very high activity in the polymerization of ethylene and mixtures thereof with higher alpha-olefins, such that purification of the resulting polymers to free them from catalyst residues is not required, but the high activity is maintained in the presence of hydrogen and other chain transfer agents used for regulating the molecular weight of the polymers formed.

For example, when ethylene is polymerized in contact with a catalyst according to this invention it is possible to regulate the molecular weight of the polyethylene formed to a value corresponding to an intrinsic viscosity, the Tetralin at 135° C., of from about 1.0 to 3.0 dl./g., while at the same time keeping the polymer yield at a value which permits the polymer being used directly without having to be subjected to special purification after-treatments for the removal of catalyst residues.

The polyethylene obtained with the aid of the present catalysts is a substantially linear and highly crystalline polymer having a density equal to or greater than 0.96 g./cc. and which has excellent workability characteristics that are, in general, superior to the workability characteristics obtained with the aid of conventional "Ziegler-type" catalysts The catalysts of the invention while being particularly useful in the polymerization and copolymerization of ethylene, are also useful in the polymerization of other olefinic monomers polymerizable by Ziegler catalysts, for instance propylene.

The following examples are given to illustrate the invention and are not intended as limiting.

EXAMPLE 1

To a four-necked flask with a stirrer, a reflux-cooler and a thermometer, kept in an inert gas atmosphere and containing 21 g. (2 moles) of $Al(isoC_4H_9)_3$ in 68 cc. of n-heptane, were added in successive batches 5 g. (1 mole) of $MgCl_2 \cdot H_2O$.

Due to the exothermicity of the reaction, the suspension began to boil; when, after about one-half hour, this effect exhausted itself, the mixture was heated under reflux of heptane for another 2 hours. After cooling down, the reaction product was filtered through a porous plate, then washed twice with n-heptane and finally dried under vacuum.

1 gram of the carrier thus obtained was suspended in 50 cc. of n-heptane in a three-encked flask fitted with a stirrer, a feeding funnel and under nitrogen atmosphere. Into this flask were introduced 0.04 g. of $TiCl_4$ and finally there were added dropwise 0.02 g. of $Al(C_2H_5)_2Cl$, in order to precipitate $TiCl_3$-$\beta$ on the magnesium compound. The product thus obtained, washed with n-heptane and then dried, contained 0.55% by weight of titanium.

0.1856 grams of the component thus prepared were introduced together with 1000 cc. of n-heptane and 2 grams of $Al(isoC_4H_9)_3$ under a nitrogen atmosphere in a stainless steel autoclave having a holding capacity of 1.8 lt., fitted with a comb stirrer (rotational speed=200 r.p.m.) and heated at a temperature of 85° C. To this reactor were fed ethylene (10 atm.) and hydrogen (3 atm.) and the pressure was maintained constant during the entire run by continuously introducing ethylene. After 4 hours the polymerization was interrupted, the suspension discharged from the autoclave and the polymer separated by filtering and then dried under vacuum at 100° C. Thereby were obtained 305 grams of granulated polyethylene having an apparent density of 0.360 g./cc., an intrinsic viscosity, measured in Tetralin at 135° C., of 2.4 dl./g. The yield in polymer amounted to 300,000 g./g. of Ti.

EXAMPLE 2

The preparation of the catalytic component described in Example 1 was repeated but with the difference that there were used 10 g. of $MgCl_2 \cdot 6H_2O$ (1 mole) and 117 g. of $Al(isoC_4H_9)_3$ (12 moles), and that 2.8 g. of carrier were treated with 0.11 g. of $TiCl_4$ and 0.31 g. of $$Al(C_2H_5)_2Cl$$

in anhydrous heptane.

The product thus obtained contained 1.05% by weight of titanium and 2% by weight of aluminum.

0.1521 grams of this catalytic component were used for the polymerization of ethylene under the same conditions as described in Example 1. Thereby were obtained 209 g. of a polymer having an apparent density of 0.320 and an intrinsic viscosity of 2.6 dl./g. The yield in polymer amounted to 131,000 g./g. of Ti.

EXAMPLE 3

The preparation of the catalytic component described in Example 1 was repeated but with the difference that there were used 7.5 (1 mole) of $MgCl_2 \cdot 6H_2O$, 86.5 g. (12 moles) of $Al(isoC_4H_9)_3$ in 236 cc. of n-heptane. 2.5 g. of the carrier were then treated with 0.15 g. of $TiCl_4$ and 0.31 g. of $Al(C_2H_5)_2Cl$ in 40 cc. of n-heptane.

The product thus obtained contained 2.12% by weight of titanium. 0.1659 g. of the catalyst were used for the polymerization of ethylene under the same conditions as described in Example 1. There were obtained 323 g. of a polymer corresponding to a yield of 94,500 g./g. of Ti, and having an apparent density of 0.359 and an intrinsic viscosity of 2.5.

EXAMPLE 4

In a flask as described in Example 1, 10 g. of $MgCl_2 \cdot 6H_2O$ (1 mole) suspended in 100 cc. of n-heptane were treated with 93 g. (12 moles) $Al(n-C_3H_7)_3$.

The reaction, once having been started, then continued spontaneously.

On 1 gram of the solid product thus obtained was precipitated $TiCl_3$-$\beta$ by treatment with 0.04 g. of $TiCl_4$ in the presence of 0.025 g. of $Al(C_2H_5)_2Cl$, according to the procedures indicated in Example 1. The analysis of the solid product thus obtained showed a content in magnesium of about 14.8% by weight, of 0.35% b.w. in titanium and 18% b.w. in aluminum.

0.41 g. of the catalyst was used for the polymerization of ethylene under the conditions described in Example 1.

Thereby were obtained 90 g. of polymer, corresponding to a yield of 61,400 g./g. of Ti. The polymer showed an apparent density of 0.370 and an intrinsic viscosity equal to 2.6.

EXAMPLE 5

10 g. of $MgCl_2 \cdot 6H_2O$ were suspended in 100 cc. of n-heptane and treated with 75 g. of $Al(C_2H_5)_3$ (a 20% heptanic solution). The mass was then reflux-heated until no further development of gas was noticed. The solid reaction product, after filtering on a porous section and drying under vacuum, weighed 14 g.

On 1.0 gram of this product was precipitated, thereupon, $TiCl_3$-$\beta$ from 0.02 g. of $TiCl_4$ and 0.015 g. of $Al(C_2H_5)_2Cl$, acccording to the procedures described in Example 1.

The product thus obtained contained 0.19% by weight of titanium and 20% by weight of aluminum.

0.56 g. of this product was then used for the polymerization of ethylene under the conditions described in Example 1. Thereby were obtained 50 g. of polymer correspond to a yield of 47,000 g./g. of Ti, and having an apparent density of 0.390 g./cc. and an intrinsic viscosity of 2.7 dl./g.

EXAMPLE 6

2.0 g. of the solid product, obtained by the reaction of $MgCl_2 \cdot 6H_2O$ with $Al(n-C_3H_7)_3$ in the quantities and under the conditions indicated in Example 4, were suspended in 20 cc. of n-heptane and treated with 0.082 g. of $TiCl_4$ added dropwise at room temperature. Stirring was kept on at room temperature for about one-half hour. Thereupon, the mas was heated up to 60° C. for 1 hour. Finally the whole was cooled down, filtered on a porous section and then dried under vacuum. The solid thus obtained contained 0.90% by weight of titanium.

0.15 g. of this solid was then used for the polymerization of ethylene under the same conditions as those indicated in Example 1. Thereby were obtained 100 g. of a polymer corresponding to a yield of 74,000 g./g. of Ti, having an apparent density of 0.380 g./cc. and an intrinsic viscosity of 2.7 dl./g.

Although the invention has been illustrated in terms of $TiCl_3$ obtained by the reduction of $TiCl_4$, and of $Al(iC_4H_9)_3$, similar results are obtained using other Ti compounds and other organometallic compounds as disclosed herein.

Therefore, changes in details can be made in practicing the invention without departing from its spirit and, consequently, we intend to include in the appended claims all such modifications as will be obvious to those skilled in the art from the description and illustrative working examples given herein.

We claim:
1. Catalysts for the polymerization of olefins and prepared by mixing
   (a) the solid obtained by contacting a titanium compound with the solid product of the reaction between a hydrated magnesium dihalide containing from 1 to 6 moles of $H_2O$ and an organometallic compound of a metal belonging to Groups I to III of the Mendelyeev Periodic Table in quantities corresponding to an organometallic compound/$H_2O$ molar ratio of at least 1; with
   (b) a hydride or organometallic compound of a metal belonging to Groups I to III of the Mendelyeev Periodic Table.

2. A catalyst according to claim 1, characterized in that the hydrated magnesium dihalide is a hydrated magnesium dichloride.

3. A catalyst according to claim 1, characterized in that the organometal compound reacted with the hydrated magnesium dihalide is a trialkyl aluminum.

4. A catalyst according to claim 1, characterized in that the hydrated magnesium dihalide and the organometallic compound are reacted in an inert diluent, at a temperature comprised between 50° C. and 150° C.

5. A catalyst according to claim 1, characterized in that the titanium compound is titanium tetrachloride.

6. A catalyst according to claim 1, characterized in that catalytic component (a) contains titanium in an amount of from 0.1% to 10% by weight.

7. A catalyst according to claim 1, characterized in that catalytic component (a) is obtained by precipitation of the titanium compound on the solid product obtained by the reaction of the hydrated magnesium dihalide and the organometallic compound.

8. A catalyst according to claim 1, characterized in that catalytic component (b) consists of the liquid phase of the reaction between the hydrated magnesium dihalide and the organometallic compound.

9. A method for preparation of a catalyst for the polymerization of olefins which comprises reacting a support which consists of a hydrated magnesium dihalide containing from 1 to 6 moles of $H_2O$ with an organometallic compound of a metal belonging to Groups I to III of the Mendelyeev Periodic Table in quantities corresponding to an organometallic compound/$H_2O$ molar ratio of at least 1, to obtain a solid reaction product, contacting a titanium compound with said solid reaction product to fix the titanium compound thereon, and mixing the solid reaction product having the titanium compound fixed thereon with a hydride or organometallic compound of a metal belonging to Groups I to III of the Mendelyeev Periodic Table.

10. The method of claim 9, wherein the reaction between the hydrated magnesium dihalide and the organometallic compound of the Groups I to III metal to obtain the solid reaction product is carried out in liquid phase and the liquid phase remaining after the reaction is used as a component of the catalyst.

11. A process for polymerizing olefins which comprises polymerizing the olefins in the presence of a catalyst obtained by mixing
   (a) a supported catalyst-forming component obtained by contacting a titanium compound with a solid support prepared by reacting a hydrated magnesium dihalide containing from 1 to 6 moles of $H_2O$ with an organometallic compound of a metal belonging to Groups I to III of the Mendelyeev Periodic Table in quantities corresponding to an organometallic compound/$H_2O$ molar ratio of at least 1; with
   (b) a hydride or organometallic compound of a metal belonging to Groups I to III of said Periodic Table.

12. The process of claim 11, wherein the hydrated magnesium dihalide is hydrated magnesium dichloride.

References Cited

UNITED STATES PATENTS

| | | | |
|---|---|---|---|
| 3,642,746 | 2/1972 | Kashiwa et al. | 260—94.9 DA |

FOREIGN PATENTS

| | | | |
|---|---|---|---|
| 1,958,046 | 6/1970 | Germany | 260—94.9 DA |
| 2,000,834 | 9/1970 | Germany | 260—94.9 DA |
| 2,000,586 | 7/1970 | Germany | 260—94.9 DA |
| 1,958,488 | 5/1970 | Germany | 260—94.9 DA |

JOSEPH L. SCHOFER, Primary Examiner

E. J. SMITH, Assistant Examiner

U.S. Cl. X.R.

252—429 C; 260—93.7, 94.9 E